No. 684,895. Patented Oct. 22, 1901.
W. O. WORTH & W. R. DONALDSON.
VEHICLE WHEEL.
(Application filed Nov. 26, 1900.)

(No Model.)

Witnesses: Harry B. White, Ray White.
Inventors: William O. Worth, William R. Donaldson, by their Attorney.

THE NORRIS PETERS CO., PHOTO-LITHO., WASHINGTON, D. C.

UNITED STATES PATENT OFFICE.

WILLIAM O. WORTH AND WILLIAM R. DONALDSON, OF CHICAGO, ILLINOIS, ASSIGNORS OF ONE-THIRD TO HENRY W. KELLOGG, OF BATTLECREEK, MICHIGAN.

VEHICLE-WHEEL.

SPECIFICATION forming part of Letters Patent No. 684,895, dated October 22, 1901.

Application filed November 26, 1900. Serial No. 37,762. (No model.)

*To all whom it may concern:*

Be it known that we, WILLIAM O. WORTH and WILLIAM R. DONALDSON, citizens of the United States, residing at Chicago, county of Cook, and State of Illinois, have invented certain new and useful Improvements in Vehicle-Wheels; and we do hereby declare the following to be a full, clear, and exact description of the invention, such as will enable persons skilled in the art to which it appertains to make and use the same.

Our invention relates to improvements in the construction of rims for vehicle-wheels.

The object of our invention is to provide a rim which, in addition to supporting the usual rubber tire, is provided with surfaces on one or both sides of the said tire to be used for the purpose of stopping the vehicle by the application of the brake-shoe thereto without the necessity of applying the said brake-shoe to the soft yielding rubber tire and in which the friction-surface is placed at the longest possible radius of the wheel, so that a minimum pressure will exert a maximum frictional effect for the purpose stated. Said surfaces, or either of them, may be toothed, so that they may afford one member of a driving-gear for propelling the vehicle or to offer a greater frictional resistance as a matter of traction.

Figure 1:
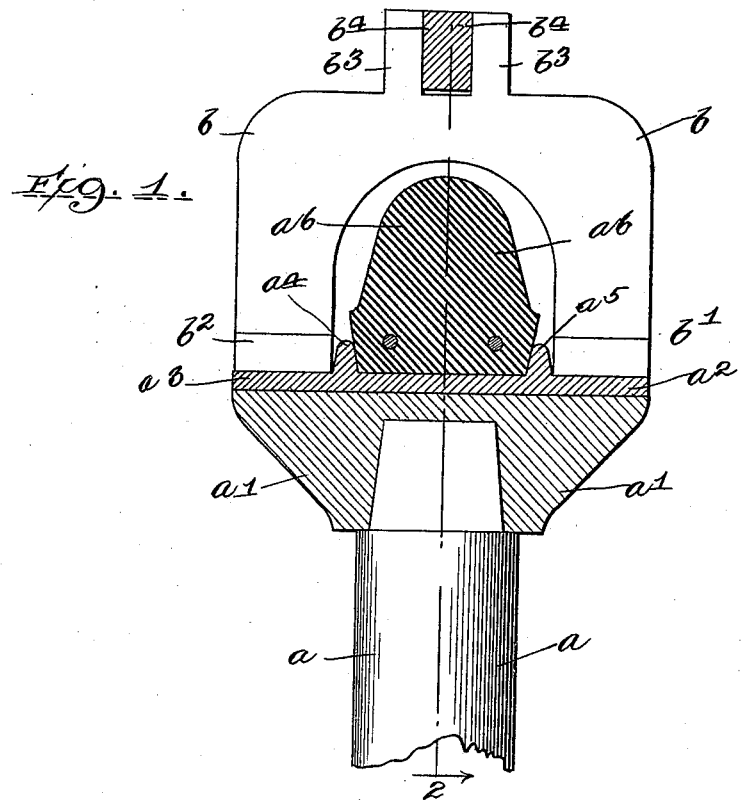
Figure 2:
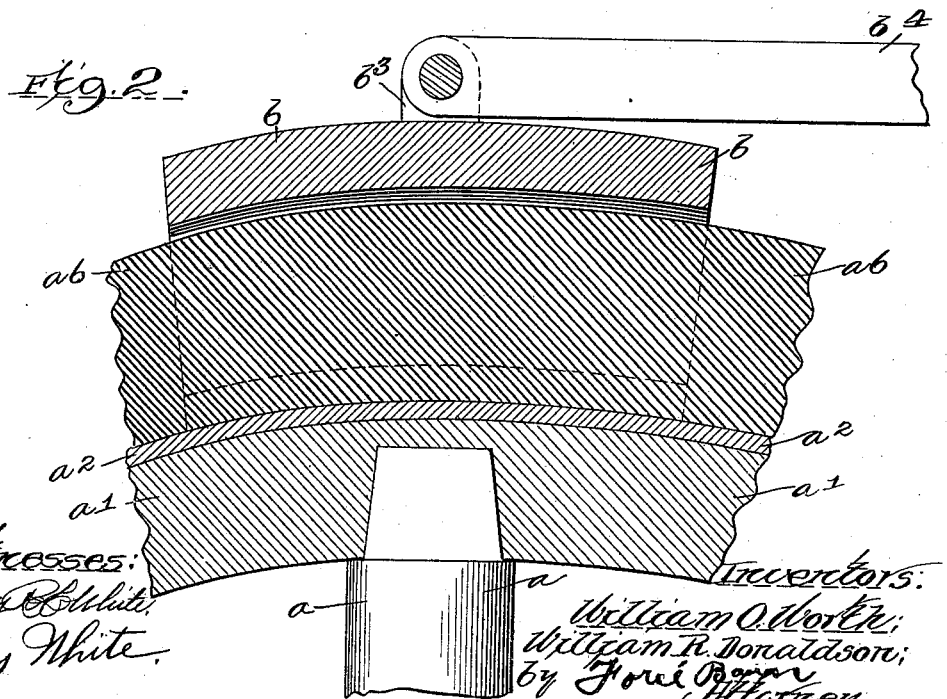

In the accompanying drawings, Figure 1 is a part section of a broken-away portion of a vehicle-wheel. Fig. 2 is a transverse section taken on line 2 2 of Fig. 1.

In both the views the same letters of reference indicate similar parts.

The spokes of a vehicle-wheel are represented by $a$, upon which the felly $a'$ is carried. The felly, as will be noticed, is much wider than those used in the ordinary construction of such wheels. The iron rim, which carries the rubber tire and which is mounted directly upon the felly, is provided with projections $a^2$ and $a^3$, which extend laterally on either side of the ribs. The ribs $a^4$ and $a^5$, between which the rubber tire is confined, as usual, extend around the rim. The peripheral surfaces $a^2$ and $a^3$ of the rim provide a smooth hard wearing-surface for the application of brake-shoes on one or either side of the tire $a^6$ without subjecting said tire to wear by the brake-shoe.

In order to utilize both surfaces by the same brake, we propose to construct a brake $b$, similar to that shown in both of the figures. The said brake-shoe is provided with removable frictional bearing-surfaces $b'$ and $b^2$, and it encompasses the rubber tire without being in contact therewith, the said surfaces extending to and making contact with the surfaces $a^2$ and $a^3$ of the rim when the brake is applied.

Aside from the advantages of providing frictional brake-surfaces on the rim of the wheel to which a brake-shoe may be applied, as previously described, by the use of the extended rim, a much larger surface of the wheel is thus presented for the purpose of buoying up or supporting the vehicle when the said vehicle is passing over a soft yielding roadway and when the tire $a^6$ has been completely buried in such roadway. It affords all the advantages of a wheel having a tire as wide as the rim herewith shown.

A projection $b^3$ from the brake-shoe $b$ is a means for attaching a lever $b^4$ and together form a conventional means for applying the brake-shoe to the surfaces of the wheel. Any convenient connecting mechanism between the seat, where the manipulator of the vehicle is stationed, and the brake-shoe may be used for the purpose of applying the said brake to the wheel when it is desired to stop the vehicle.

It is evident that either of the projections $a^2$ or $a^3$, which extend upon each side of the tire, may alone be used for the brake instead of both sides, as shown, without departing from the spirit of our invention.

We do not wish to be limited to the exact construction shown, as we claim the right to the use of either or both sides of the projection of the said rim from the tire mounted thereon for the purpose described.

Having described our invention, what we claim as new, and desire to secure by Letters Patent of the United States, is—

1. In a vehicle-wheel a rim, a continuous, annular tire mounted on the said rim, a rib on either side of said tire, and a flat annular surface on the said rim extending laterally from the said rib, substantially as set forth.

2. In a vehicle-wheel, a rim, a continuous annular tire mounted on said rim, braking frictional surfaces on said rim on either side of said tire, and a brake adapted to engage with said surfaces and to bridge said tire, substantially as set forth.

In testimony whereof we have signed this specification, in the presence of two subscribing witnesses, this 13th day of November, A. D. 1900.

WILLIAM O. WORTH.
WILLIAM R. DONALDSON.

Witnesses:
FORÉE BAIN,
M. F. ALLEN.